United States Patent [19]

Fujishima

[11] 4,310,911
[45] Jan. 12, 1982

[54] CONTROL INFORMATION DETECTING METHOD AND APPARATUS IN OPTICAL-TYPE VIDEO DISC PLAYER

[75] Inventor: Tooru Fujishima, Yokohama, Japan

[73] Assignee: Hitachi, Ltd., Tokyo, Japan

[21] Appl. No.: 7,809

[22] Filed: Jan. 30, 1979

[30] Foreign Application Priority Data

Jan. 30, 1978 [JP] Japan .................. 53-8249

[51] Int. Cl.³ .................. H04N 5/76; G11B 7/00
[52] U.S. Cl. .................. 369/45; 369/44; 360/77; 250/201; 250/202
[58] Field of Search .................. 358/128, 128.5; 250/201, 202, 203; 369/43, 44, 45; 360/77; 179/100.3 V, 100.16

[56] References Cited

U.S. PATENT DOCUMENTS

| | | | |
|---|---|---|---|
| 3,848,095 | 11/1974 | Wohlmut | 179/100.3 V |
| 3,876,827 | 4/1975 | Jonssen | 179/100.3 V |
| 3,932,700 | 1/1976 | Snopko | 179/100.3 V |
| 3,952,191 | 4/1976 | Linet | 250/201 |
| 3,985,952 | 10/1976 | Adler | 179/100.3 V |
| 4,032,776 | 6/1977 | Von Rosmalen | 250/201 |
| 4,063,287 | 12/1977 | Von Rosmalen | 179/100.3 V |
| 4,074,312 | 2/1978 | Rosmalen | 179/100.3 V |
| 4,118,735 | 10/1978 | Wilkinson | 179/100.1 G |
| 4,193,091 | 3/1980 | Kleuters | 358/128.5 |

OTHER PUBLICATIONS

Journal of SMPTEE; vol. 83, (Jul. 1974) pp. 564–579.

*Primary Examiner*—Alan Faber
*Attorney, Agent, or Firm*—Craig and Antonelli

[57] ABSTRACT

For focus and tracking controls for a pickup of an optical-type video disc player, wobbles are simultaneously applied to focus and tracking adjustment mechanisms. The wobble for focus and the wobble for tracking are effected by two signals 90° phase-shifted from each other. The respective informations representative of focus and tracking errors are separately detected in a synchronous detection manner using the same two signals to provide focus and tracking control signals.

12 Claims, 2 Drawing Figures

CONTROL INFORMATION DETECTING METHOD AND APPARATUS IN OPTICAL-TYPE VIDEO DISC PLAYER

BACKGROUND OF THE INVENTION

The present invention relates to control techniques for a pickup of an optical-type video disc player, etc., and more particularly to control information detecting method and apparatus in a servo system performing focus and tracking controls for the pickup, for example.

Since the present invention is preferably applicable to an optical-type video disc player, the subsequent explanation will be made in connection with a servo system for a pickup of the optical-type video disc player though any limitation to the present invention is not intended thereby. Such a servo system requires an automatic focus control for focussing the spot of read-out light onto a recording surface of a generally disc-shaped recording medium having information recorded thereon and a so-called tracking control for accurately positioning the light spot on a recording track. Various prior art measures have been proposed for such controls and for the detection of control signals used therein. A known signal detecting method for the automatic focus control includes a scheme in which light passing out of the optical axis of a lens is used together with a two-separate photodetector, a scheme in which a cylindrical lens and a four-separate photodetector are used, and an wobbling scheme in which the position of a lens, etc. is slightly moved or wobbled. On the other hand, a known signal detecting method for the tracking control includes a scheme in which two light spots and two individual photodetectors are used, and an wobbling scheme in which a light beam is slightly moved or wobbled in a lateral or transversal direction in relation to the optical axis. Some of such schemes are disclosed in four articles published by the journal of the SMPTE, Vol. 83, (July 1974): the Compaan et al article entitled "The Philips 'VLP' system" in pp. 564–566, the Bussche et al article entitled "Signal processing in the Philips 'VLP' system" in pp. 567–571, the Janseen et al article entitled "Control mechanisms in the Philips 'VLP' record player" in pp. 576–579, and the Bouwhuis et al article entitled "The optical scanning system of the Philips 'VLP' record player" in pp. 572–575.

The above-described either scheme, other than the wobbling scheme, requiring additional photodetector or optical system as a control means in addition to a read-out means for reading out the recorded information, involves an inherent problem that a special detector or a plurality of optical systems must be employed, thereby resulting in a complicated device structure, an expensive device cost and difficulties in adjustment accompanying poor reliability.

To the contrary, the wobbling scheme is advantageous in that no additional or extra photodetector is required, thereby making the optical system simple. However, it has hitherto been difficult to simultaneously employ the wobbling scheme to both the automatic focus control and the tracking control. The reason is that if small movements or wobbles to be used in the respective control systems for automatic-focus and tracking are applied to a light beam to obtain signals for the automatic-focus control and the tracking control, the light input onto the detector would involve variations in a form of the product of the respective small wobbles, thereby making it difficult to separately and individually obtain signals for the respective controls.

SUMMARY OF THE INVENTION

An object of the present invention is to provide control information detecting method and means in a video disc player which can be implemented with low cost and simple structure.

Another object of the present invention is to provide control information detecting method and apparatus which are capable of simultaneously using the wobbling scheme to two kinds of controls such as the automatic-focus control and the tracking control.

To that end, the respective small wobbles for two kinds of controls are provided by means of two signals having a predetermined phase difference (for example, 90°) therebetween and a detector output is detected by means of the two signals and in synchronism therewith. Thus, informations for the respective controls can be separately detected.

More especially, it is assumed, for example, that the displacement of a read-out light spot from the optimum focus position is x and the displacement from the optimum tracking position is y. Then, the light input Z onto the detector can be approximately represented as follows:

$$Z = (A - ax^2)(B + by^2) \quad (1)$$

Here, A, a, B and b are constants.

If a deviation from the optimum focus position or the degree of off-focus $x_o$ and a deviation from the optimum tracking position or the degree of off-tracking $y_o$ exist and the wobbles of $\alpha \sin \omega t$ and $\beta \cos \omega t$ are applied to the focus and tracking control systems respectively, the displacements x and y may be expressed by the following equation (2):

$$\left. \begin{array}{l} x = x_o + \alpha \sin \omega t \\ y = y_o + \beta \cos \omega t \end{array} \right\} \quad (2)$$

In that case, the component Z' of angular frequency $\omega$ in the light output can be represented in a form of the following equation (3) by introducing the equation (2) into the equation (1) and extracting only the component of angular frequency $\omega$:

$$Z' = -x_o \alpha a (2B + 2by_o^2 + b\beta^2) \sin \omega t + y_o \beta b(-2A + 2ax_o^2 + a\alpha^2) \cos \omega t \quad (3)$$

As seen from the equation (3), the component of angular frequency $\omega$ includes informations relating to $x_o$ and $y_o$. Therefore, if this output signal is detected by means of the wobbling signals of $\sin \omega t$ and $\cos \omega t$ and in a manner synchronized therewith, one can obtain only signals which are proportional to $x_o$ and $y_o$ respectively. Thus, such a synchronous detection by the wobbling signals easily allows separate detections of the respective control informations even if the wobbles for the two kinds of controls are simultaneously provided. As a result, there is provided a simple pickup control system in which no extra auxiliary light beam or special photodetector such as a separate photodiode is required.

The equation (3) also shows that the first term concerning $x_o$ contains a factor of $2by_o^2$ and hence the loop gain of the system varies with the variation in $y_o$. However, the loop gain of the system can be preset so that the influence of the factor $2by_o^2$ is negligible. The same holds for the second term concerning $y_o$ in which a factor of $2ax_o^2$ is contained.

DESCRIPTION OF THE PREFERRED EMBODIMENTS

Figure 1:
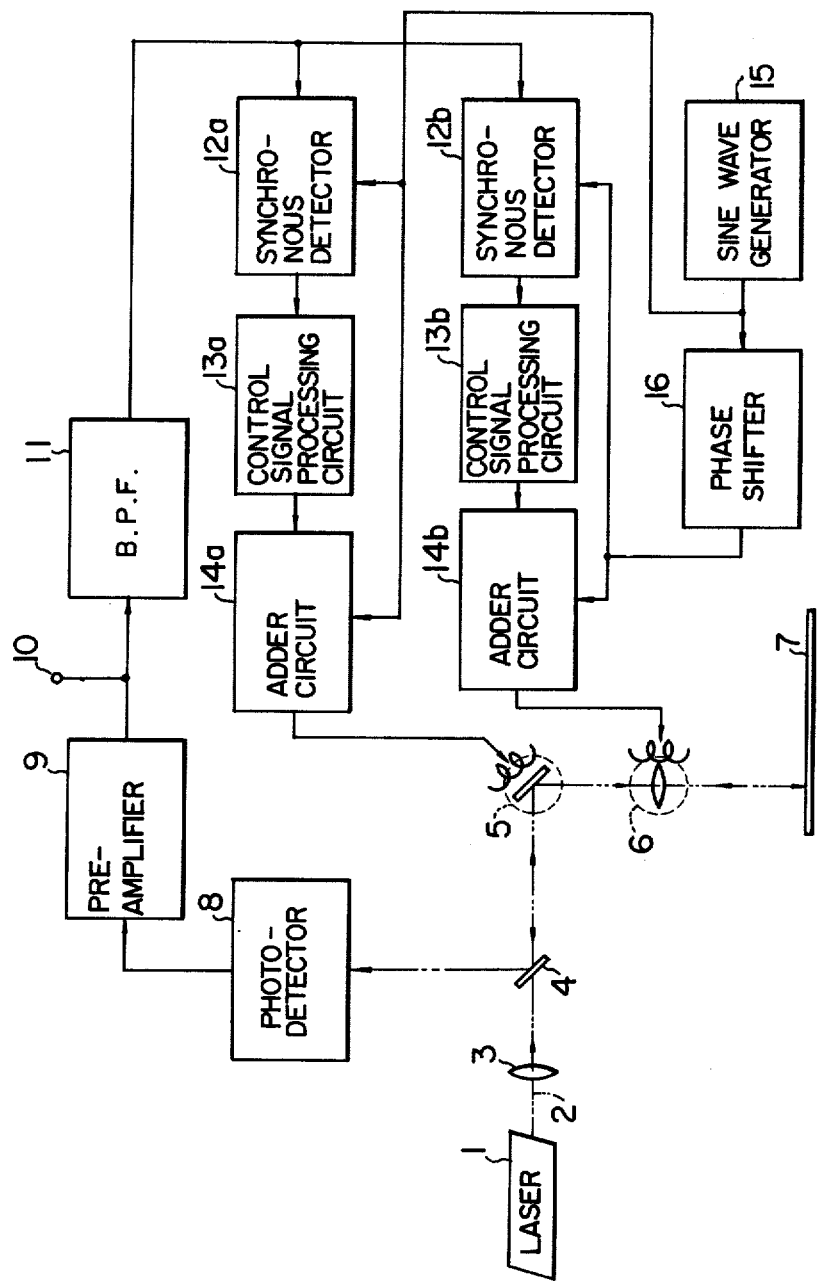
FIG. 1 is a block diagram showing an example of a pickup control system in an optical-type video disc player according to the present invention.

In FIG. 1 showing an embodiment of the present invention, reference numeral 1 designates a light source of laser. The laser 1 has no special requirement imparted thereon and there may be used any laser which is available in video disc players. Numeral 2 shows the path of a typical light beam. The light beam emitted from the laser 1 passes through an intermediate lens 3, a beam splitter 4, a galvanomirror 5 and an objective lens 6 onto a video disc 7 (a recording medium) to focus a light spot thereon. The light beam reflected from the video disc 7 and modulated by an information signal recorded on the rotating video disc 7 travels through the objective lens 6 and the galvanomirror 5 and is then reflected by the beam splitter 4 to be imaged onto the photosensitive surface of a photodetector 8.

The beam splitter 4 may be a prism or a half-mirror and has a function of directing the light flux from the laser 1 to the side of the video disc 7 while changing the optical axis so as to direct the reflected light flux from the video disc 7 towards the photodetector 8. The galvanomirror 5 is constructed such that the angle of a reflecting surface of the mirror 5 in relation to the optical axis of the laser light is changeable in response to an externally applied electric signal. That is, the signal applied to the galvanometer mirror 5 is effective to move a light spot to be focused on the disc 7 in a direction transverse to the original optical axis between the photodetector 8 and the disc 7. This mechanism may be easily realized by the combination of a magnet and a drive coil. The objective lens 6 is constructed such that it is movable along its optical axis in response to an externally applied electric signal. That is, the signal applied to the objective lens 6 moves the light spot to be focused on the disc 7 in the direction of the original optical axis between the disc 7 and the photodetector 8. This mechanism may be easily realized by the combination of a magnet and a voice coil coupled with the lens in the same way as a driving mechanism for a loudspeaker diaphragm.

The light reflected from the video disc 7 and incident onto the photodetector 8 through the beam splitter 4 is photo-electrically converted into an electric signal which in turn is supplied through a preamplifier circuit 9 to an output terminal 10. The signal on the output terminal 10 is applied to a video signal processing device (not shown) comprising a demodulator circuit, in which information such as a video signal having recorded on the video disc 7 is reproduced.

A main arrangement characteristic of the present invention comprises a sine wave signal generator circuit 15, a 90° phase shifter circuit 16, a band pass filter 11 which allows the transmission of a signal component having a frequency equal to that of the signal generated by the sine wave signal generator circuit 15, synchronous detector circuits 12a and 12b each of which may include a low pass filter, control signal processing circuits 13a and 13b each of which may include a phase compensator and an amplifier, and adder circuits 14a and 14b each of which may include an amplifier.

A signal of angular frequency $\omega$ generated by the sine wave signal generator circuit 15, after 90° phase-shifted in the 90° phase shifter circuit 16, is applied to the drive coil of the objective lens 6 through the adder circuit 14b. Thus, the wobble of $a \sin \omega t$ is provided to the objective lens 6 along its optical axis so that the spot position at the optimum focus point wobbles in a direction perpendicular to the recording surface of the video disc 7. The aperture of the photodetector 8 is preset so that the output of the photodetector 8 varies in the form of a quadratic curve in response to the relative positional relationship between the video disc 7 and the objective lens 6. The output of the sine wave signal generator circuit 15 is also applied to the galvanomirror 5 through the adder circuit 14a so that the light spot is subjected to the wobble of $\beta \cos \omega t$ in a direction transverse to the information recording track of the video disc 7.

Thus, the output from the photodetector 8 includes variation components depending upon the above-described two kinds of wobbling movements. This photodetector output is applied through the pre-amplifier circuit 9 to the band pass filter 11 of its central angular frequency $\omega$, in which those variation components are extracted and supplied to the synchronous detector circuits 12a and 12b. The circuits 12a and 12b are also applied with the output from the sine wave signal generator circuit 15 and the 90° phase-shifted signal thereof from the phase shifter circuit 16. In synchronism with these signals, therefore, the above variation components are detected in the synchronous detector circuits 12a and 12b to provide a focus control signal and a tracking control signal. These signals are respectively supplied to the control signal processing circuits 13a, 13b and then the adder circuits 14a, 14b, thereby completing an automatic control system.

It should be thus understood that even if two kinds of wobbling movements are simultaneously applied, separate detections of two control informations are facilitated through the provision of the wobbling movements by signals 90° phase-shifted from each other and through the synchronous detection using the same signals.

Figure 2:
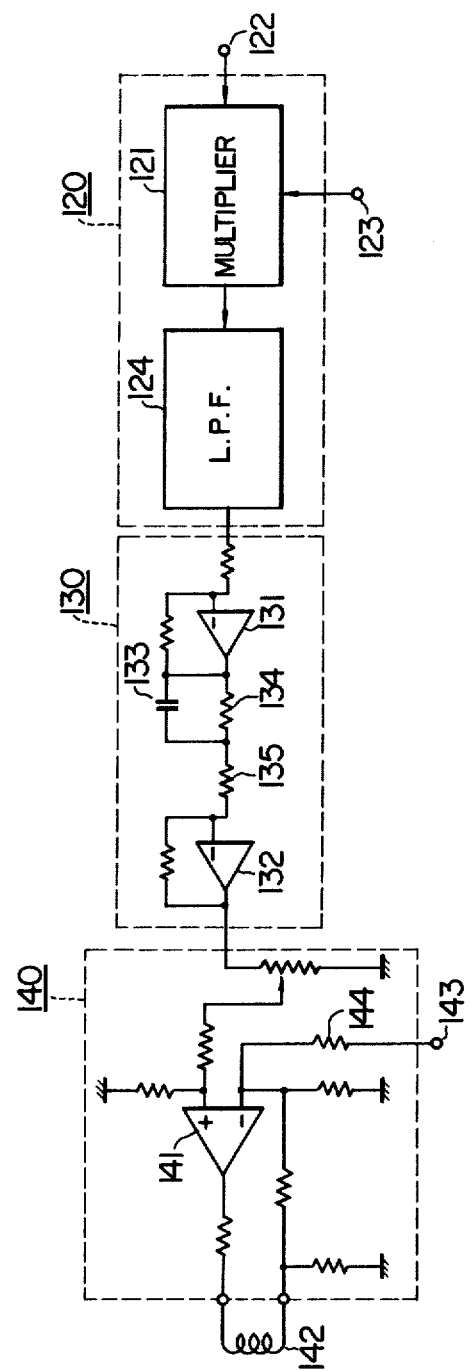
FIG. 2 exemplarily shows a concrete structure of the synchronous detector circuit, the control signal processing circuit and the adder circuit shown in FIG. 1.

FIG. 2 shows an example of a concrete structure of the synchronous detector circuit 12a or 12b, the control signal processing circuit 13a or 13b and the adder circuit 14a or 14b, in connection with either the focus control or the tracking control since the same circuit arrangement can be basically used for both the controls.

Referring to FIG. 2, the synchronous detector circuit generally indicated by 120 is composed of a multiplier 121 and a low pass filter 124 for eliminating unwanted frequency components generated in the multiplier 121. The output of the band pass filter 11 (FIG. 1) is applied to a terminal 122 while the output of the sine wave signal generator circuit 15 or the output of the 90° phase shifter circuit 16 (FIG. 1) is applied to a terminal 123.

The control signal processing circuit generally indicated by 130 is composed of operational amplifiers 131 and 132 having a buffer and amplification function and a phase compensator. A capacitor 133 and resistors 134, 135 form a lead compensating circuit for compensating the loop characteristics of the control system including the frequency characteristic of the driving system of the galvanomirror 5 or objective lens 6.

Finally, the adder circuit generally indicated by 140 is composed of an amplifier 141 for providing a current feedback to drive a drive coil 142 of the galvanomirror 5 or objective lens 6 with a constant current. The output of the sine wave signal generator circuit 15 or the output of the 90° phase shifter circuit 16 (FIG. 1) is applied to a terminal 143 and added to an output stage of the amplifier 141 through a resistor 144.

It is preferable that the frequency of the signal generated by the sine wave signal generator circuit 5, i.e. an wobbling frequency is high to enhance the response frequency of the control servo system. The upper limit of the wobbling frequency may be determined to be a value at which the interference with the information signal such as a video signal is immaterial. In a practical use, however, a range of several kilohertz to 100 KHz is preferably selected because of a restriction by the frequency response characteristic of an actuator of the galvanomirror 5 or objective lens 6.

In the foregoing embodiment, light reflected from the video disc 7 has been detected by the photodetector 8. But, it should be noted that the present invention is similarly applicable to the case where light transmitted through the video disc 7 is detected by a photodetector.

In the foregoing embodiment, the present invention has been described and shown in conjunction with the servo system for the pickup of the optical-type video disc player. However, it should be understood that the principle of the present invention is widely applicable to any control system for controlling a relative positional relationship between an object to be controlled and a detecting means.

I claim:

1. A method of controlling the relative positional relationship between an object to be controlled and a single photodetector having an original optical axis therebetween by means of the response to small wobbles applied in two independent directions, comprising:
    a step of applying small wobbles to the relative positional relationships between said object and said single photodetector in a first direction transverse to the original optical axis therebetween and a second direction of the original optical axis, respectively, by two signals phase-shifted from each other and having the same frequency;
    a step of processing an output of said single photodetector responsive to said small wobbles by means of said two signals to separately detect respective informations representative of the relative optical positional relationships in said first and second directions; and
    a step of controlling the relative positional relationships between said object and said photodetector in said first and second directions in accordance with the separately detected informations, respectively.

2. A method according to claim 1, wherein said two signals phase-shifted from each other have a 90° phase difference therebetween.

3. An apparatus for applying small wobbles in two independent directions to the relative positional relationship between an object to be controlled and a single photodetector having an original optical axis therebetween and separately detecting the respective responses to the wobbles in the two directions to control said relative positional relationship, comprising:
    signal generating means for generating two signals phase-shifted from each other and having the same frequency;
    means for causing small wobbles to the relative positional relationships between said object and said single photodetector in a first direction transverse to the original optical axis therebetween and a second direction of the original optical axis, respectively, by means of said two signals generated from said signal generating means; and
    means for branching an output derivable from said single photodetector in response to said small wobbles and detecting the branched output by means of said two signals and in synchronism therewith.

4. An apparatus according to claim 3, wherein said two signals generated from said signal generating means have a 90° phase difference therebetween.

5. In an apparatus in which a light beam is irradiated upon a recording track of a moving recording medium having an information signal recorded thereon and a reflected or transmitted version of the irradiated light beam is detected to read out the information signal, a device for detecting deviations in two independent directions of the relative positional relationship between the optimum focus spot of said light beam and said recording track to control said relative positional relationship, said device comprising:
    signal generating means for generating two signals phase-shifted from each other and having the same frequency;
    means for wobbling the optimum focus spot of said light beam in a direction perpendicular to the plane of said recording track by means of one of said two signals generated from said signal generating means;
    means for wobbling the optimum focus spot of said light beam in a direction transverse to said recording track by means of the other of said two signals generated from said signal generating means;
    photo-detecting means for converting, a version of the light beam reflected from or transmitted through said recording medium, into an electric signal;
    means for detecting the electric signal from said photo-detecting means by said one signal from said signal generating means and in synchronism therewith to detect a deviation of the optimum focus spot of said light beam in the direction perpendicular to the plane of said recording track; and
    means for detecting the electric signal from said photo-detecting means by said other signal from said signal generating means and in synchronism therewith to detect a deviation of the optimum focus spot of said light beam in the direction transverse to said recording track.

6. An apparatus according to claim 5, wherein said two signals generated from said signal generating means have a 90° phase difference therebetween.

7. An apparatus according to claim 5, further comprising means for generating the light beam, the light beam generating means being independent of the photo-detecting means.

8. In a video disc player in which a light beam is irradiated upon a recording track of a rotating disc-shaped recording medium having an information signal recorded thereon and a reflected or transmitted version of the irradiated light beam is detected to read out the recorded information signal, a device for detecting a deviation of said light beam from the optimum focus and a deviation of the tracking of said light beam to control the focus and tracking of said light beam, said device comprising:

signal generating means for generating two signals 90° phase-shifted from each other and having the same frequency;

means for wobbling the optimum focus position of said light beam in a direction perpendicular to the plane of said recording track of said recording medium by means of one of said two signals generated from said signal generating means;

means for wobbling said light beam in a direction transverse to said recording track of said recording medium by means of the other of said two signals generated from said signal generating means;

means for detecting a version of the light beam reflected from or transmitted through said recording medium and extracting from the detected output a signal component having a frequency equivalent to that of said signals generated from said signal generating;

means for detecting the extracted signal component from said extracting means by said one signal from said signal generating means and in synchronism therewith to detect the focus deviation of said light beam; and means for detecting the extracted signal component from said extracting means by said other signal from said signal generating means and in synchronism therewith to detect the tracking deviation of said light beam.

9. A method of controlling the relative positional relationship between an object to be controlled and a single photodetector having an original optical axis therebetween by means of the response to small wobbles applied in two independent directions, comprising:

a step of applying small wobbles to the relative positional relationships between said object an said single photodetector in a first direction transverse to the original optical axis therebetween and a second direction of the original optical axis, respectively, by two signals phase-shifted from each other;

a step of processing an output of said single photodetector responsive to said small wobbles by means of said two signals to separately detect respective informations respresentative of the relative optical positional relationships in said first and second directions; and a step of controlling the relative positional relationships between said object and said photodetector in said first and second directions in accordance with the separately detected informations, respectively; the object to be controlled being a light spot to be focused on a video disc, the applied small wobbles controlling the relative positional relationship between the light spot and the photodetector with one of the two signals applying a wobble to a mirror to effectively move the light spot in said first direction transverse to the original optical axis therebetween and the other of the two signals applying a wobble to a lens to effectively move the light spot in said second direction of the original optical axis.

10. A method according to claim 9, wherein said two signals phase-shifted from each other have a 90° phase difference therebetween.

11. An apparatus for applying small wobbles in two independent directions to the relative positional relationship between an object to be controlled and a single photodetector having an original optical axis therebetween and separately detecting the respective responses to the wobbles in the two directions to control said relative positional relationship, comprising:

signal generating means for generating two signals phase-shifted from each other;

means for causing small wobbles to the relative positional relationships between said object and said single photodetector in a first direction transverse to the original optical axis therebetween and a second direction of the original optical axis, respectively, by means of said two signals generated from said signal generating means; and means for branching an output derivable from said single photodetector in response to said small wobbles and detecting the branched output by means of said two signals and in synchronism therewith; the object to be controlled being a light spot to be focused on a video disc, said means for causing small wobbles including a mirror means responsive to one of said two signals for effectively moving the light spot in said first direction transverse to the original optical axis, and lens means responsive to the other of said two signals for effectively moving the light spot in said second direction of the original optical axis.

12. An apparatus according to claim 11, wherein said two signals generated from said signal generating means have a 90° phase difference therebetween.

* * * * *